(12) United States Patent
Khlat

(10) Patent No.: US 9,413,416 B2
(45) Date of Patent: Aug. 9, 2016

(54) TRANSMIT AND RECEIVE RF MULTIPLEXER

(71) Applicant: RF Micro Devices, Inc., Greensboro, NC (US)

(72) Inventor: Nadim Khlat, Cugnaux (FR)

(73) Assignee: Qorvo US, Inc., Greensboro, NC (US)

( * ) Notice: Subject to any disclaimer, the term of this patent is extended or adjusted under 35 U.S.C. 154(b) by 58 days.

(21) Appl. No.: 14/525,092

(22) Filed: Oct. 27, 2014

(65) Prior Publication Data

US 2015/0118978 A1    Apr. 30, 2015

Related U.S. Application Data

(60) Provisional application No. 61/895,764, filed on Oct. 25, 2013.

(51) Int. Cl.
*H04B 7/00* (2006.01)
*H04B 1/52* (2015.01)

(52) U.S. Cl.
CPC ........................................ *H04B 1/52* (2013.01)

(58) Field of Classification Search
CPC .................................... H04B 1/52; H04B 1/40
USPC ........................................................ 455/522
See application file for complete search history.

(56) References Cited

U.S. PATENT DOCUMENTS

| 7,330,500 | B2 | 2/2008 | Kouki | |
|---|---|---|---|---|
| 8,149,742 | B1 * | 4/2012 | Sorsby | H04B 1/0057 370/219 |
| 8,634,029 | B2 | 1/2014 | Pugel | |
| 8,933,764 | B2 | 1/2015 | Khlat et al. | |
| 2002/0053954 | A1 | 5/2002 | Shamsaifar et al. | |
| 2002/0130734 | A1 | 9/2002 | Liang et al. | |
| 2002/0137471 | A1 | 9/2002 | Satoh et al. | |
| 2005/0239421 | A1 | 10/2005 | Kim et al. | |
| 2008/0240000 | A1 | 10/2008 | Kidd | |
| 2010/0102899 | A1 | 4/2010 | Engel | |
| 2013/0077540 | A1 | 3/2013 | Black et al. | |
| 2013/0083703 | A1 | 4/2013 | Granger-Jones et al. | |
| 2013/0135052 | A1 * | 5/2013 | Arkiszewski | H03F 3/19 330/295 |
| 2013/0201880 | A1 | 8/2013 | Bauder et al. | |

(Continued)

OTHER PUBLICATIONS

Vizmuller, Peter, "Chapter 2: Circuit Examples," RF Design Guide: Systems, Circuits, and Equations, Norwood: Artech House, 1995, pp. 95-98.

(Continued)

*Primary Examiner* — Wesley Kim
*Assistant Examiner* — Raj Chakraborty
(74) *Attorney, Agent, or Firm* — Withrow & Terranova, P.L.L.C.

(57) ABSTRACT

A transmit and receive RF multiplexer, which includes a first hybrid RF transmit coupler, a first hybrid RF receive coupler, a hybrid RF antenna coupler, and RF bandpass filter and inversion circuitry, is disclosed. The first hybrid RF transmit coupler has a first main transmit port and a pair of transmit ports having a first in-phase transmit port and a first quadrature-phase transmit port. The first hybrid RF receive coupler has a first main receive port and a pair of receive ports having a first in-phase receive port and a first quadrature-phase receive port. The hybrid RF antenna coupler has a main coupler port and a pair of coupler ports having an in-phase coupler port and a quadrature-phase coupler port, such that the main coupler port is coupled to a primary RF antenna.

30 Claims, 8 Drawing Sheets

(56) References Cited

U.S. PATENT DOCUMENTS

2014/0185498 A1 7/2014 Schwent et al.
2014/0269853 A1 9/2014 Gudem et al.

OTHER PUBLICATIONS

Young, Leo, et al., "A High Power Diplexing Filter," IRE Transactions on Microwave Theory and Techniques, vol. 7, No. 3, Jul. 1959, pp. 384-387.
U.S. Appl. No. 14/498,746, filed Sep. 26, 2014.
U.S. Appl. No. 14/523,065, filed Oct. 24, 2014.
U.S. Appl. No. 14/547,502, filed Nov. 19, 2014.
U.S. Appl. No. 14/498,991, filed Sep. 26, 2014.
U.S. Appl. No. 14/497,919, filed Sep. 26, 2014.
Non-Final Office Action for U.S. Appl. No. 14/498,991, mailed Aug. 17, 2015, 13 pages.
Non-Final Office Action for U.S. Appl. No. 14/498,746, mailed Feb. 24, 2016, 11 pages.
Final Office Action for U.S. Appl. No. 14/498,991, mailed Feb. 3, 2016, 14 pages.
Non-Final Office Action for U.S. Appl. No. 14/497,919, mailed Mar. 10, 2016, 21 pages.

* cited by examiner

TRANSMIT AND RECEIVE RF MULTIPLEXER

RELATED APPLICATIONS

This application claims the benefit of U.S. provisional patent application No. 61/895,764, filed Oct. 25, 2013, the disclosure of which is incorporated herein by reference in its entirety.

FIELD OF THE DISCLOSURE

Embodiments of the present disclosure relate to radio frequency (RF) communications systems, which may include RF front-end circuitry, RF transceiver circuitry, RF transmit circuitry, RF receive circuitry, RF multiplexers, RF diplexers, RF duplexers, RF filters, RF antennas, RF switches, RF combiners, RF splitters, the like, or any combination thereof.

BACKGROUND

As wireless communications technologies evolve, wireless communications systems become increasingly sophisticated. As such, wireless communications protocols continue to expand and change to take advantage of the technological evolution. As a result, to maximize flexibility, many wireless communications devices must be capable of supporting any number of wireless communications protocols, each of which may have certain performance requirements, such as specific out-of-band emissions requirements, linearity requirements, or the like. Further, portable wireless communications devices are typically battery powered and need to be relatively small, and have low cost. As such, to minimize size, cost, and power consumption, RF circuitry in such a device needs to be as simple, small, flexible, and efficient as is practical. Thus, there is a need for RF circuitry in a communications device that is low cost, small, simple, flexible, efficient, and conforms to wireless communications protocols.

SUMMARY

A transmit and receive RF multiplexer, which includes a first hybrid RF transmit coupler, a first hybrid RF receive coupler, a hybrid RF antenna coupler, and RF bandpass filter and inversion circuitry, is disclosed according to one embodiment of the present disclosure. The first hybrid RF transmit coupler has a first main transmit port and a pair of transmit ports having a first in-phase transmit port and a first quadrature-phase transmit port. The first hybrid RF receive coupler has a first main receive port and a pair of receive ports having a first in-phase receive port and a first quadrature-phase receive port. The hybrid RF antenna coupler has a main coupler port and a pair of coupler ports having an in-phase coupler port and a quadrature-phase coupler port, such that the main coupler port is coupled to a primary RF antenna.

The RF bandpass filter and inversion circuitry provides bandpass filtering between the pair of coupler ports and the pair of transmit ports. The RF bandpass filter and inversion circuitry further provides bandpass filtering between the pair of coupler ports and the pair of receive ports. Additionally, the RF bandpass filter and inversion circuitry provides a signal inversion associated with only one of the in-phase coupler port and the quadrature-phase coupler port.

Those skilled in the art will appreciate the scope of the disclosure and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the disclosure and illustrate the best mode of practicing the disclosure. Upon reading the following description in light of the accompanying drawings, those skilled in the art will understand the concepts of the disclosure and will recognize applications of these concepts not particularly addressed herein. It should be understood that these concepts and applications fall within the scope of the disclosure and the accompanying claims.

A transmit and receive RF multiplexer, which includes a first hybrid RF transmit coupler, a first hybrid RF receive coupler, a hybrid RF antenna coupler, and RF bandpass filter and inversion circuitry, is disclosed according to one embodiment of the present disclosure. The first hybrid RF transmit coupler has a first main transmit port and a pair of transmit ports having a first in-phase transmit port and a first quadrature-phase transmit port. The first hybrid RF receive coupler has a first main receive port and a pair of receive ports having a first in-phase receive port and a first quadrature-phase receive port. The hybrid RF antenna coupler has a main coupler port and a pair of coupler ports having an in-phase coupler port and a quadrature-phase coupler port, such that the main coupler port is coupled to a primary RF antenna.

The RF bandpass filter and inversion circuitry provides bandpass filtering between the pair of coupler ports and the pair of transmit ports. The RF bandpass filter and inversion circuitry further provides bandpass filtering between the pair of coupler ports and the pair of receive ports. Additionally, the RF bandpass filter and inversion circuitry provides a signal inversion associated with only one of the in-phase coupler port and the quadrature-phase coupler port.

Figure 1:
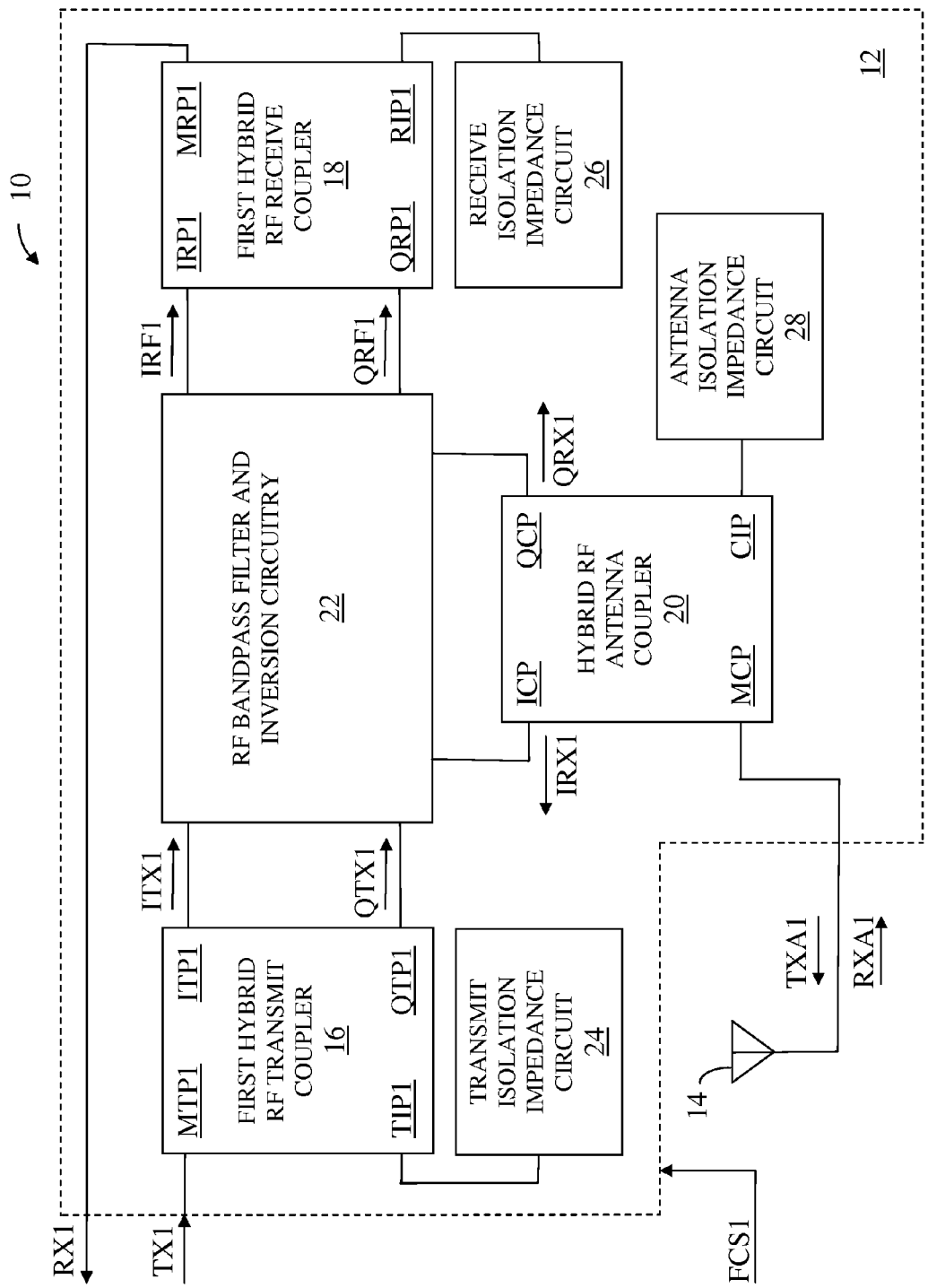
FIG. 1 shows RF circuitry according to one embodiment of the RF circuitry.

FIG. 1 shows RF circuitry 10 according to one embodiment of the RF circuitry 10. The RF circuitry 10 includes a transmit and receive RF multiplexer 12 and a primary RF antenna 14. The transmit and receive RF multiplexer 12 illustrated in FIG. 1 is an RF duplexer according to one embodiment of the transmit and receive RF multiplexer 12. The transmit and receive RF multiplexer 12 includes a first hybrid RF transmit coupler 16, a first hybrid RF receive coupler 18, a hybrid RF antenna coupler 20, RF bandpass filter and inversion circuitry 22, a transmit isolation impedance circuit 24, a receive isolation impedance circuit 26, and an antenna isolation impedance circuit 28.

The first hybrid RF transmit coupler 16 has a first main transmit port MTP1, a first in-phase transmit port ITP1, a first quadrature-phase transmit port QTP1, and a first transmit isolation port TIP1. The first hybrid RF receive coupler 18 has a first main receive port MRP1, a first in-phase receive port IRP1, a first quadrature-phase receive port QRP1, and a first receive isolation port RIP1. The hybrid RF antenna coupler 20 has a main coupler port MCP, an in-phase coupler port ICP, a quadrature-phase coupler port QCP, and a coupler isolation port CIP.

The main coupler port MCP is coupled to the primary RF antenna 14. The RF bandpass filter and inversion circuitry 22 is coupled to the first in-phase transmit port ITP1, the first quadrature-phase transmit port QTP1, the first in-phase receive port IRP1, the first quadrature-phase receive port QRP1, the in-phase coupler port ICP, and the quadrature-phase coupler port QCP. As such, the RF bandpass filter and inversion circuitry 22 provides bandpass filtering between the hybrid RF antenna coupler 20 and the first hybrid RF receive coupler 18, and further provides bandpass filtering between the hybrid RF antenna coupler 20 and the first hybrid RF transmit coupler 16.

The transmit isolation impedance circuit 24 is coupled to the first transmit isolation port TIP1. The receive isolation impedance circuit 26 is coupled to the first receive isolation port RIP1. The antenna isolation impedance circuit 28 is coupled to the coupler isolation port CIP. In one embodiment of the transmit isolation impedance circuit 24, the transmit isolation impedance circuit 24 presents at least a partial matching impedance to the first transmit isolation port TIP1. In one embodiment of the receive isolation impedance circuit 26, the receive isolation impedance circuit 26 presents at least a partial matching impedance to the first receive isolation port RIP1. In one embodiment of the antenna isolation impedance circuit 28, the antenna isolation impedance circuit 28 presents at least a partial matching impedance to the coupler isolation port CIP.

In one embodiment of the RF circuitry 10, the transmit and receive RF multiplexer 12 receives a first function configuration signal FCS1, such that certain configurations of the transmit and receive RF multiplexer 12 are based on the first function configuration signal FCS1. In one embodiment of the first hybrid RF transmit coupler 16, the first hybrid RF transmit coupler 16 receives a first transmit signal TX1 via the first main transmit port MTP1, and then splits and phase-shifts the first transmit signal TX1 to provide a first in-phase transmit signal ITX1 and a first quadrature-phase transmit signal QTX1. In one embodiment of the first hybrid RF transmit coupler 16, the first quadrature-phase transmit signal QTX1 is phase-shifted from the first in-phase transmit signal ITX1 by about 90 degrees.

By splitting the first transmit signal TX1 into the first in-phase transmit signal ITX1 and the first quadrature-phase transmit signal QTX1, the power level of the first transmit signal TX1 is divided into two signals that each have 3 dB less power than the first transmit signal TX1. The reduced power levels may reduce distortion in the transmit signal paths due to non-linear components, such as tuning components, in the transmit signal paths.

The RF bandpass filter and inversion circuitry 22 receives, filters, and forwards the first in-phase transmit signal ITX1 and the first quadrature-phase transmit signal QTX1 to the hybrid RF antenna coupler 20 via the in-phase coupler port ICP and the quadrature-phase coupler port QCP, respectively.

The hybrid RF antenna coupler 20 receives, phase-shifts, and combines the forwarded first in-phase transmit signal ITX1 and the forwarded first quadrature-phase transmit signal QTX1 to provide a first antenna transmit signal TXA1 to the primary RF antenna 14 via the main coupler port MCP. In one embodiment of the hybrid RF antenna coupler 20, the forwarded and phase-shifted first in-phase transmit signal ITX1 and first quadrature-phase transmit signal QTX1 are about phase-aligned with one another before the hybrid RF antenna coupler 20 combines the forwarded and phase-shifted first in-phase transmit signal ITX1 and first quadrature-phase transmit signal QTX1.

In one embodiment of the RF bandpass filter and inversion circuitry 22, the RF bandpass filter and inversion circuitry 22 filters the first in-phase transmit signal ITX1 and the first quadrature-phase transmit signal QTX1 to substantially pass transmit frequencies of the first in-phase transmit signal ITX1 and the first quadrature-phase transmit signal QTX1, thereby allowing the first in-phase transmit signal ITX1 and the first quadrature-phase transmit signal QTX1 to be forwarded to the hybrid RF antenna coupler 20.

In one embodiment of the RF bandpass filter and inversion circuitry 22, the RF bandpass filter and inversion circuitry 22 filters the first in-phase transmit signal ITX1 and the first quadrature-phase transmit signal QTX1 to substantially stop transmit frequencies of the first in-phase transmit signal ITX1 and the first quadrature-phase transmit signal QTX1, thereby substantially blocking the first in-phase transmit signal ITX1 and the first quadrature-phase transmit signal QTX1 from the first quadrature-phase receive port QRP1 and the first in-phase receive port IRP1.

In one embodiment of the RF bandpass filter and inversion circuitry 22, the RF bandpass filter and inversion circuitry 22 applies an additional phase-shift between the first in-phase transmit signal ITX1 and the first quadrature-phase transmit signal QTX1 of about 180 degrees, which is a phase inversion, such that any remainders of the first in-phase transmit signal ITX1 and the first quadrature-phase transmit signal QTX1 that reach the first quadrature-phase receive port QRP1 and the first in-phase receive port IRP1 will be received, phase-shifted, and substantially cancelled by the first hybrid RF receive coupler 18.

The blocking of the first in-phase transmit signal ITX1 and the first quadrature-phase transmit signal QTX1 from the first quadrature-phase receive port QRP1 and the first in-phase receive port IRP1 combined with the phase inversion described above provides increased isolation of the first main receive port MRP1 from the first in-phase transmit signal ITX1 and first quadrature-phase transmit signal QTX1. In general, the increased isolation during transmissions of RF signals effectively isolates the first main receive port MRP1 from the first main transmit port MTP1.

In one embodiment of the RF circuitry 10, the hybrid RF antenna coupler 20 receives a first antenna receive signal RXA1 via the main coupler port MCP, and then splits and phase-shifts the first antenna receive signal RXA1 to provide a first in-phase receive signal IRX1 and a first quadrature-phase receive signal QRX1. In one embodiment of the hybrid RF antenna coupler 20, the first quadrature-phase receive signal QRX1 is phase-shifted from the first in-phase receive signal IRX1 by about 90 degrees.

The RF bandpass filter and inversion circuitry 22 receives, filters, and forwards the first in-phase receive signal IRX1 and the first quadrature-phase receive signal QRX1 to provide a first filtered in-phase receive signal IRF1 and a first filtered quadrature-phase receive signal QRF1 to the first hybrid RF receive coupler 18 via the first in-phase receive port IRP1 and the first quadrature-phase receive port QRP1, respectively. The first hybrid RF receive coupler 18 receives, phase-shifts, and combines the first filtered in-phase receive signal IRF1 and the first filtered quadrature-phase receive signal QRF1 to provide a first receive signal RX1 via the first main receive port MRP1. In one embodiment of the first hybrid RF receive coupler 18, after the first hybrid RF receive coupler 18 has phase-shifted the first filtered in-phase receive signal IRF1 and first filtered quadrature-phase receive signal QRF1, the phase-shifted first filtered in-phase receive signal IRF1 and first filtered quadrature-phase receive signal QRF1 are about phase-aligned with one another.

In one embodiment of the RF bandpass filter and inversion circuitry 22, the RF bandpass filter and inversion circuitry 22 filters the first in-phase receive signal IRX1 and the first quadrature-phase receive signal QRX1 to substantially pass receive frequencies of the first in-phase receive signal IRX1 and the first quadrature-phase receive signal QRX1, thereby allowing the first in-phase receive signal IRX1 and the first quadrature-phase receive signal QRX1 to be forwarded to the first hybrid RF receive coupler 18.

In one embodiment of the RF bandpass filter and inversion circuitry 22, the RF bandpass filter and inversion circuitry 22 filters the first in-phase receive signal IRX1 and the first quadrature-phase receive signal QRX1 to substantially stop receive frequencies of the first in-phase receive signal IRX1 and the first quadrature-phase receive signal QRX1, thereby substantially blocking the first in-phase receive signal IRX1 and the first quadrature-phase receive signal QRX1 from the first quadrature-phase transmit port QTP1 and the first in-phase transmit port ITP1.

In one embodiment of the RF bandpass filter and inversion circuitry 22, the RF bandpass filter and inversion circuitry 22 applies an additional phase-shift between the first filtered in-phase receive signal IRF1 and the first filtered quadrature-phase receive signal QRF1 of about 180 degrees, which is a phase inversion, such that any remainders of the first filtered in-phase receive signal IRF1 and the first filtered quadrature-phase receive signal QRF1 that reach the first quadrature-phase transmit port QTP1 and the first in-phase transmit port ITP1 will be received, phase-shifted, and substantially cancelled by the first hybrid RF transmit coupler 16.

The blocking of the first in-phase receive signal IRX1 and the first quadrature-phase receive signal QRX1 from the first quadrature-phase transmit port QTP1 and the first in-phase transmit port ITP1 combined with the phase inversion described above provide increased isolation of the first main transmit port MTP1 from the first in-phase receive signal IRX1 and the first quadrature-phase receive signal QRX1. In general, the increased isolation during receptions of RF signals effectively isolates the first main transmit port MTP1 from the first main receive port MRP1. As previously mentioned, the increased isolation during transmissions of RF signals effectively isolates the first main receive port MRP1 from the first main transmit port MTP1.

In this regard, during both transmissions and receptions of RF signals, the first main transmit port MTP1 and the first main receive port MRP1 are effectively isolated from one another due to the increased isolation. As a result, during high voltage standing wave ratio (VSWR) conditions at the primary RF antenna 14 due to antenna mismatch, the increased isolation may allow the RF circuitry 10 to operate effectively. In one embodiment of the RF circuitry 10, the RF circuitry 10 may operate effectively with a VSWR of three to one.

Additionally, the increased isolation may provide broadband frequency isolation between the first main receive port MRP1 and the first main transmit port MTP1, such that broadband frequency cancellation occurs rather than just cancellation at a single frequency. This broadband frequency isolation may allow the RF circuitry 10 to be used for carrier aggregation applications. As such, in alternate embodiments of the RF circuitry 10, the RF circuitry 10 provides receive carrier aggregation, transmit carrier aggregation, or both. When providing both receive carrier aggregation and transmit carrier aggregation, the RF circuitry 10 may provide the receive carrier aggregation and transmit carrier aggregation simultaneously.

In one embodiment of the RF circuitry 10, the hybrid RF antenna coupler 20 simultaneously transmits and receives the first antenna transmit signal TXA1 and first antenna receive signal RXA1, respectively, via the main coupler port MCP.

As previously mentioned, the transmit isolation impedance circuit 24 is coupled to the first transmit isolation port TIP1, the receive isolation impedance circuit 26 is coupled to the first receive isolation port RIP1, and the antenna isolation impedance circuit 28 is coupled to the coupler isolation port CIP. As such, the transmit isolation impedance circuit 24 presents a transmit isolation impedance to the first transmit isolation port TIP1. In one embodiment of the transmit isolation impedance circuit 24, the transmit isolation impedance circuit 24 provides about a 90 degree phase-shift at the first transmit isolation port TIP1. The receive isolation impedance circuit 26 presents a receive isolation impedance to the first receive isolation port RIP1. The antenna isolation impedance circuit 28 presents an antenna isolation impedance to the coupler isolation port CIP.

The first hybrid RF transmit coupler 16 receives the first transmit signal TX1, which has a transmit frequency, via the first main transmit port MTP1. The first hybrid RF receive coupler 18 provides the first receive signal RX1, which has a receive frequency, via the first main receive port MRP1. In one embodiment of the transmit isolation impedance circuit 24, the transmit isolation impedance circuit 24 is configurable, such that the transmit isolation impedance is based on the first function configuration signal FCS1. In one embodiment of the receive isolation impedance circuit 26, the receive isolation impedance circuit 26 is configurable, such that the receive isolation impedance is based on the first function configuration signal FCS1. In one embodiment of the antenna isolation impedance circuit 28, the antenna isolation impedance circuit 28 is configurable, such that the antenna isolation impedance is based on the first function configuration signal FCS1.

In one embodiment of the RF circuitry 10, VSWR mismatch at the primary RF antenna 14 may degrade isolation between the first main transmit port MTP1 and the first main receive port MRP1 at the transmit frequency. As such, in one embodiment of the transmit isolation impedance circuit 24, the transmit isolation impedance circuit 24 is configured to adjust the transmit isolation impedance to increase isolation between the first main transmit port MTP1 and the first main receive port MRP1 at the transmit frequency.

In one embodiment of the RF circuitry 10, VSWR mismatch at the primary RF antenna 14 may degrade isolation between the first main transmit port MTP1 and the first main receive port MRP1 at the receive frequency. As such, in one embodiment of the receive isolation impedance circuit 26, the receive isolation impedance circuit 26 is configured to adjust the receive isolation impedance to increase isolation between the first main transmit port MTP1 and the first main receive port MRP1 at the receive frequency.

In one embodiment of the RF circuitry 10, VSWR mismatch at the primary RF antenna 14 may degrade isolation between the first main transmit port MTP1 and the first main receive port MRP1. As such, in one embodiment of the antenna isolation impedance circuit 28, the antenna isolation impedance circuit 28 is configured to adjust the antenna isolation impedance to increase isolation between the first main transmit port MTP1 and the first main receive port MRP1.

In one embodiment of the first hybrid RF transmit coupler 16, the first hybrid RF transmit coupler 16 provides harmonic filtering to at least partially remove harmonics of the first transmit signal TX1. The first transmit signal TX1 has a transmit frequency, such that the harmonics of the first transmit signal TX1 are harmonics of the transmit frequency. In one embodiment of the first transmit signal TX1, the transmit frequency is variable. As such, in one embodiment of the first hybrid RF transmit coupler 16, the first hybrid RF transmit coupler 16 provides tunable harmonic filtering, which is tuned by the first hybrid RF transmit coupler 16 using the first function configuration signal FCS1 based on the transmit frequency.

In one embodiment of the hybrid RF antenna coupler 20, the hybrid RF antenna coupler 20 provides harmonic filtering to at least partially remove harmonics of the first transmit signal TX1. The first transmit signal TX1 has the transmit frequency, such that the harmonics of the first transmit signal TX1 are harmonics of the transmit frequency. In one embodiment of the first transmit signal TX1, the transmit frequency is variable. As such, in one embodiment of the hybrid RF antenna coupler 20, the hybrid RF antenna coupler 20 provides tunable harmonic filtering, which is tuned by the hybrid RF antenna coupler 20 using the first function configuration signal FCS1 based on the transmit frequency.

In alternate embodiments of the RF circuitry 10, any or all of the transmit isolation impedance circuit 24, the receive isolation impedance circuit 26, the antenna isolation impedance circuit 28, the first transmit isolation port TIP1, the first receive isolation port RIP1, and the coupler isolation port CIP are omitted. In an alternate embodiment of the RF circuitry 10, the first function configuration signal FCS1 is omitted.

Figure 2:
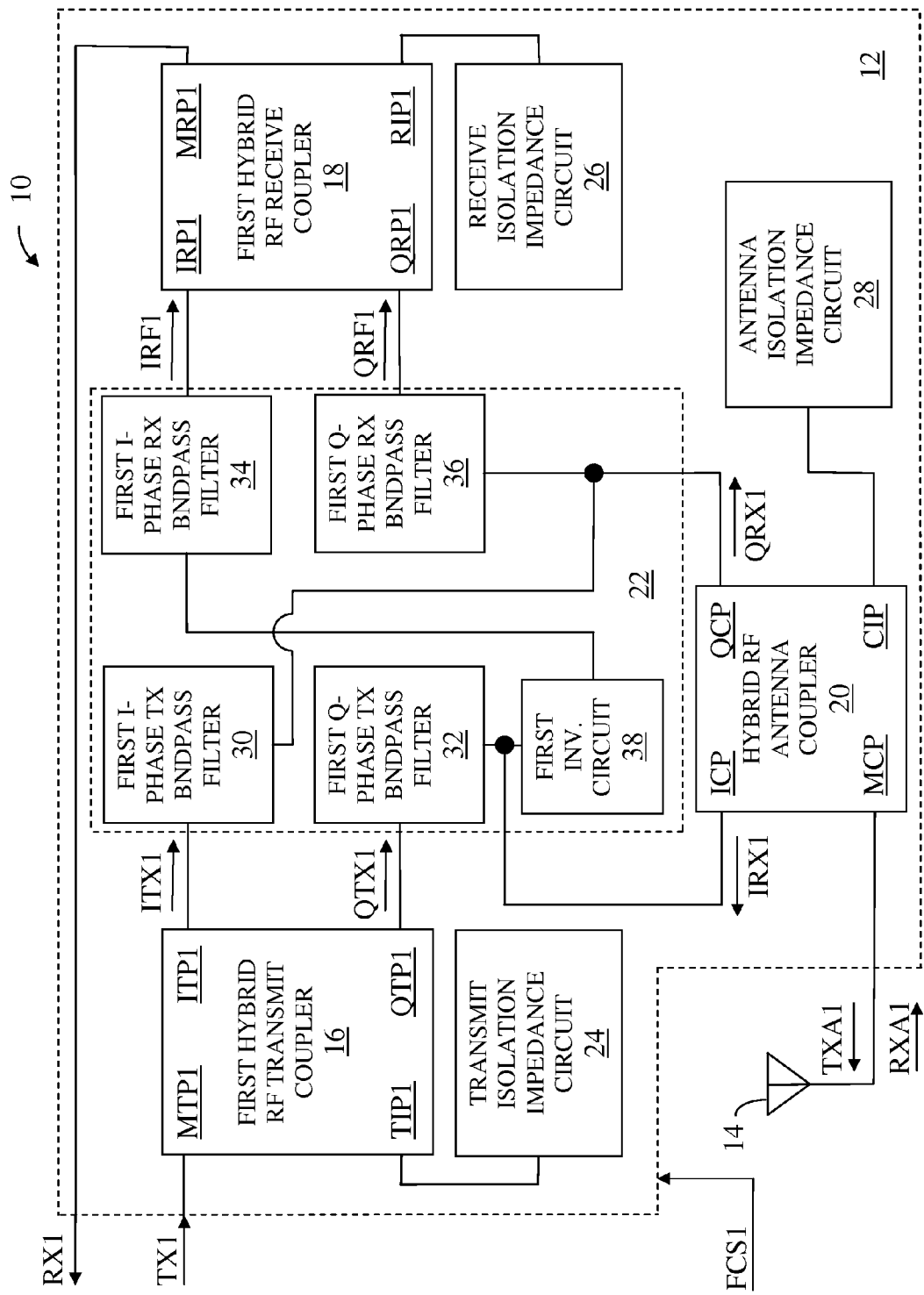
FIG. 2 shows the RF circuitry according to an alternate embodiment of the RF circuitry.

FIG. 2 shows the RF circuitry 10 according to an alternate embodiment of the RF circuitry 10. The RF circuitry 10 illustrated in FIG. 2 is similar to the RF circuitry 10 illustrated in FIG. 1, except the RF circuitry 10 illustrated in FIG. 2 shows details of the RF bandpass filter and inversion circuitry 22. The RF bandpass filter and inversion circuitry 22 includes a first in-phase transmit bandpass filter 30, a first quadrature-phase transmit bandpass filter 32, a first in-phase receive bandpass filter 34, a first quadrature-phase receive bandpass filter 36, and a first inversion circuit 38.

The first in-phase transmit bandpass filter 30 is coupled between the quadrature-phase coupler port QCP and the first in-phase transmit port ITP1. The first quadrature-phase transmit bandpass filter 32 is coupled between the in-phase coupler port ICP and the first quadrature-phase transmit port QTP1. The first in-phase receive bandpass filter 34 and the first inversion circuit 38 are coupled in series between the in-phase coupler port ICP and the first in-phase receive port IRP1. In this regard, the signal inversion is associated with the in-phase coupler port ICP. The first quadrature-phase receive bandpass filter 36 is coupled between the quadrature-phase coupler port QCP and the first quadrature-phase receive port QRP1.

In general, the RF bandpass filter and inversion circuitry 22 provides the signal inversion, which is associated with only one of the in-phase coupler port ICP and the quadrature-phase coupler port QCP. As mentioned above, the signal inversion is associated with the in-phase coupler port ICP.

As such, the RF bandpass filter and inversion circuitry 22 provides bandpass filtering between the hybrid RF antenna coupler 20 and the first hybrid RF receive coupler 18, and further provides bandpass filtering between the hybrid RF antenna coupler 20 and the first hybrid RF transmit coupler 16.

The first in-phase transmit bandpass filter 30 includes a first order resonator that substantially passes a transmit frequency of the first in-phase transmit signal ITX1 and substantially stops receive frequencies of the first quadrature-phase receive signal QRX1. The first quadrature-phase transmit bandpass filter 32 includes a first order resonator that substantially passes a transmit frequency of the first quadrature-phase transmit signal QTX1 and substantially stops receive frequencies of the first in-phase receive signal IRX1. The first in-phase receive bandpass filter 34 includes a first order resonator that substantially passes a receive frequency of the first in-phase receive signal IRX1 and substantially stops transmit frequencies of the first quadrature-phase transmit signal QTX1. The first quadrature-phase receive bandpass filter 36 includes a first order resonator that substantially passes a receive frequency of the first quadrature-phase receive signal QRX1 and substantially stops transmit frequencies of the first in-phase transmit signal ITX1.

In one embodiment of the first in-phase transmit bandpass filter 30, the first order resonator of the first in-phase transmit bandpass filter 30 is tunable, such that the first in-phase transmit bandpass filter 30 uses the first function configuration signal FCS1, which is based on the transmit frequency, to tune the first order resonator.

In one embodiment of the first quadrature-phase transmit bandpass filter 32, the first order resonator of the first function configuration signal FCS1 is tunable, such that the first quadrature-phase transmit bandpass filter 32 uses the first function configuration signal FCS1, which is based on the transmit frequency, to tune the first order resonator.

In one embodiment of the first in-phase receive bandpass filter 34, the first order resonator of the first in-phase receive bandpass filter 34 is tunable, such that the first in-phase receive bandpass filter 34 uses the first function configuration signal FCS1, which is based on the receive frequency, to tune the first order resonator.

In one embodiment of the first quadrature-phase receive bandpass filter 36, the first order resonator of the first quadrature-phase receive bandpass filter 36 is tunable, such that the first quadrature-phase receive bandpass filter 36 uses the first function configuration signal FCS1, which is based on the receive frequency, to tune the first order resonator.

In an alternate embodiment of the RF circuitry 10, the first inversion circuit 38 is omitted, such that the first in-phase receive bandpass filter 34 is directly coupled between the in-phase coupler port ICP and the first in-phase receive port IRP1. As such, an upstream signal path to the first in-phase receive bandpass filter 34 between the hybrid RF antenna coupler 20 and the first in-phase receive bandpass filter 34, a downstream signal path from the first in-phase receive bandpass filter 34 between the first in-phase receive bandpass filter 34 and the first hybrid RF receive coupler 18, or both are differential signal paths. In this regard, one of the upstream signal path and the downstream signal path provides a signal inversion to replace the signal inversion that would otherwise be provided by the first inversion circuit 38.

Figure 3:
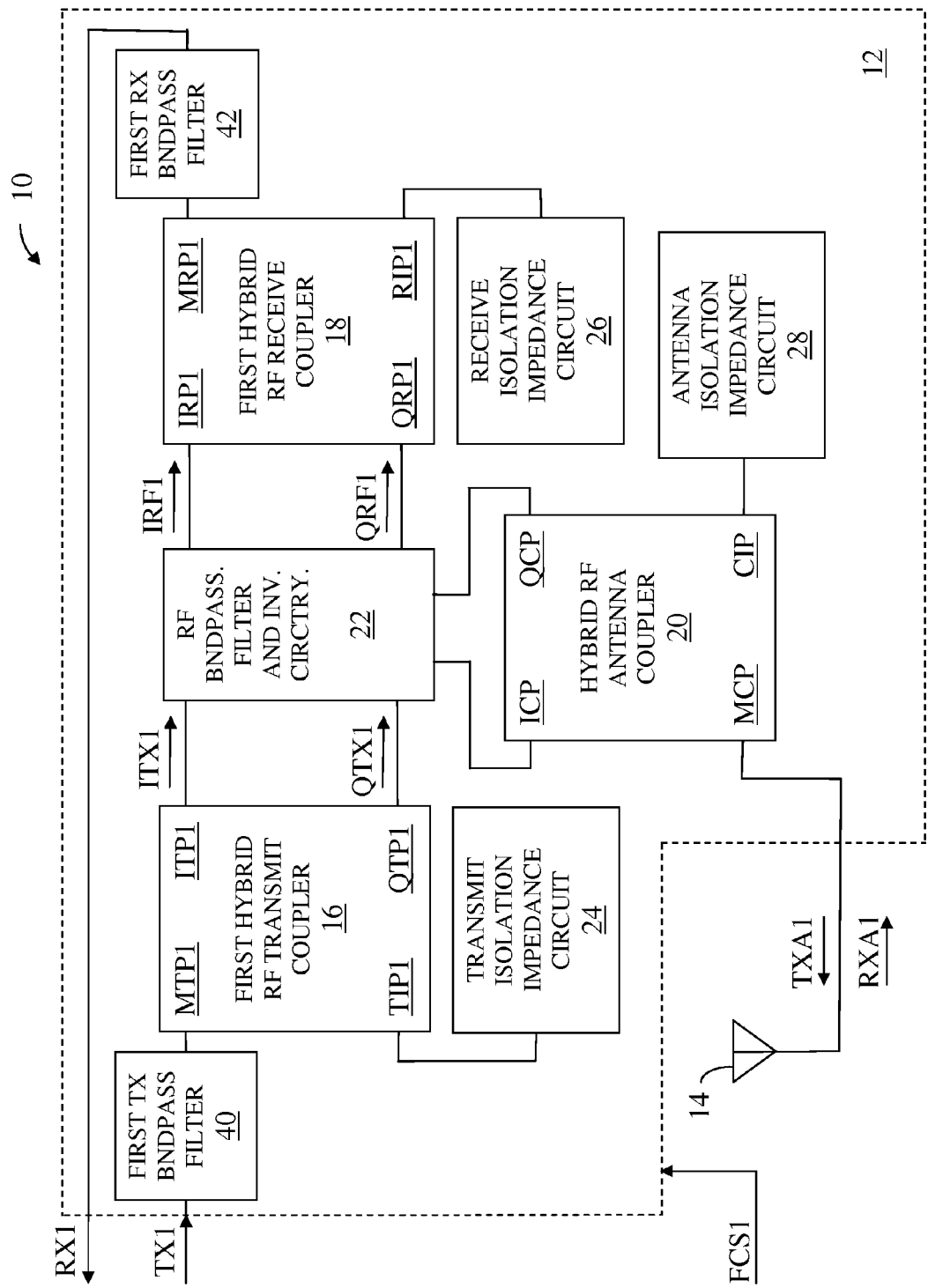
FIG. 3 shows the RF circuitry according to an additional embodiment of the RF circuitry.

FIG. 3 shows the RF circuitry 10 according to an additional embodiment of the RF circuitry 10. The RF circuitry 10 illustrated in FIG. 3 is similar to the RF circuitry 10 illustrated in FIG. 1, except the transmit and receive RF multiplexer 12 illustrated in FIG. 3 further includes a first transmit bandpass filter 40 and a first receive bandpass filter 42.

The first transmit bandpass filter 40 is coupled to the first main transmit port MTP1 and the first receive bandpass filter 42 is coupled to the first main receive port MRP1. As such, the first transmit bandpass filter 40 receives and filters the first transmit signal TX1 to provide a filtered transmit signal to the first hybrid RF transmit coupler 16 via the first main transmit port MTP1. The first receive bandpass filter 42 receives and filters a signal from the first hybrid RF receive coupler 18 via the first main receive port MRP1 to provide the first receive signal RX1.

The first transmit bandpass filter 40 substantially passes a transmit frequency of the first transmit signal TX1 and substantially stops receive frequencies of the first receive signal RX1. Conversely, the first receive bandpass filter 42 substantially passes a receive frequency of the first receive signal RX1 and substantially stops transmit frequencies of the first transmit signal TX1.

In one embodiment of the first transmit bandpass filter 40, the first transmit bandpass filter 40 is a second order, or higher, bandpass filter. In one embodiment of the first receive bandpass filter 42, the first receive bandpass filter 42 is a second order, or higher, bandpass filter. In one embodiment of the first transmit bandpass filter 40, the first transmit bandpass filter 40 is a tunable bandpass filter that uses the first function configuration signal FCS1, which is based on the transmit frequency, to tune the first transmit bandpass filter 40. In one embodiment of the first receive bandpass filter 42, the first receive bandpass filter 42 is a tunable bandpass filter that uses the first function configuration signal FCS1, which is based on the receive frequency, to tune the first receive bandpass filter 42.

Figure 4:
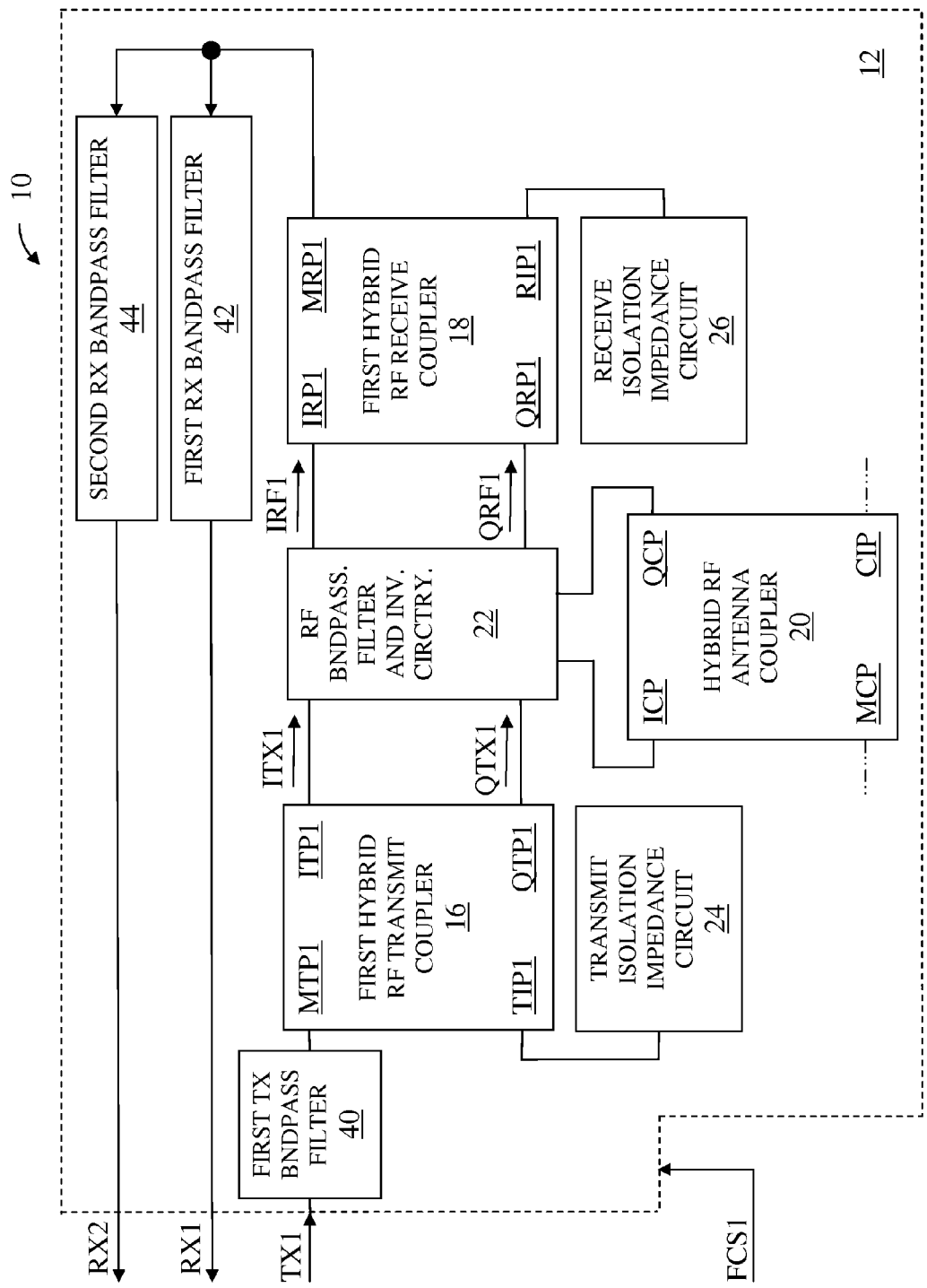
FIG. 4 shows the RF circuitry according to another embodiment of the RF circuitry.

FIG. 4 shows the RF circuitry 10 according to another embodiment of the RF circuitry 10. The transmit and receive RF multiplexer 12 illustrated in FIG. 4 is an RF triplexer with one transmitter and two receivers according to one embodiment of the transmit and receive RF multiplexer 12. The RF circuitry 10 illustrated in FIG. 4 is similar to the RF circuitry 10 illustrated in FIG. 3, except in the RF circuitry 10 illustrated in FIG. 4, the primary RF antenna 14 and the antenna isolation impedance circuit 28 are not shown to simplify FIG. 4, and the transmit and receive RF multiplexer 12 further includes a second receive bandpass filter 44. In one embodiment of the second receive bandpass filter 44, the second receive bandpass filter 44 is similar to the first receive bandpass filter 42.

The second receive bandpass filter 44 is coupled to the first main receive port MRP1. As previously mentioned, the first receive bandpass filter 42 receives and filters the signal from the first hybrid RF receive coupler 18 via the first main receive port MRP1 to provide the first receive signal RX1. In a similar manner, the second receive bandpass filter 44 receives and filters the signal from the first hybrid RF receive coupler 18 via the first main receive port MRP1 to provide a second receive signal RX2.

In a first embodiment of the transmit and receive RF multiplexer 12 illustrated in FIG. 4, the transmit and receive RF multiplexer 12 provides the first receive signal RX1 and the second receive signal RX2 simultaneously. In a second embodiment of the transmit and receive RF multiplexer 12 illustrated in FIG. 4, the transmit and receive RF multiplexer 12 provides the first receive signal RX1 and the second receive signal RX2, and receives the first transmit signal TX1 simultaneously. In a third embodiment of the transmit and receive RF multiplexer 12 illustrated in FIG. 4, the transmit and receive RF multiplexer 12 provides the first receive signal RX1 and receives the first transmit signal TX1 simultaneously. In a fourth embodiment of the transmit and receive RF multiplexer 12 illustrated in FIG. 4, the transmit and receive RF multiplexer 12 provides the second receive signal RX2 and receives the first transmit signal TX1 simultaneously.

In this regard, to prevent interference between the first receive signal RX1, the second receive signal RX2, and the first transmit signal TX1, the first receive bandpass filter 42 substantially passes a receive frequency of the first receive signal RX1, substantially stops transmit frequencies of the first transmit signal TX1, and substantially stops a receive frequency of the second receive signal RX2. Additionally, the second receive bandpass filter 44 substantially passes a receive frequency of the second receive signal RX2, substantially stops transmit frequencies of the first transmit signal TX1, and substantially stops a receive frequency of the first receive signal RX1.

Figure 5:
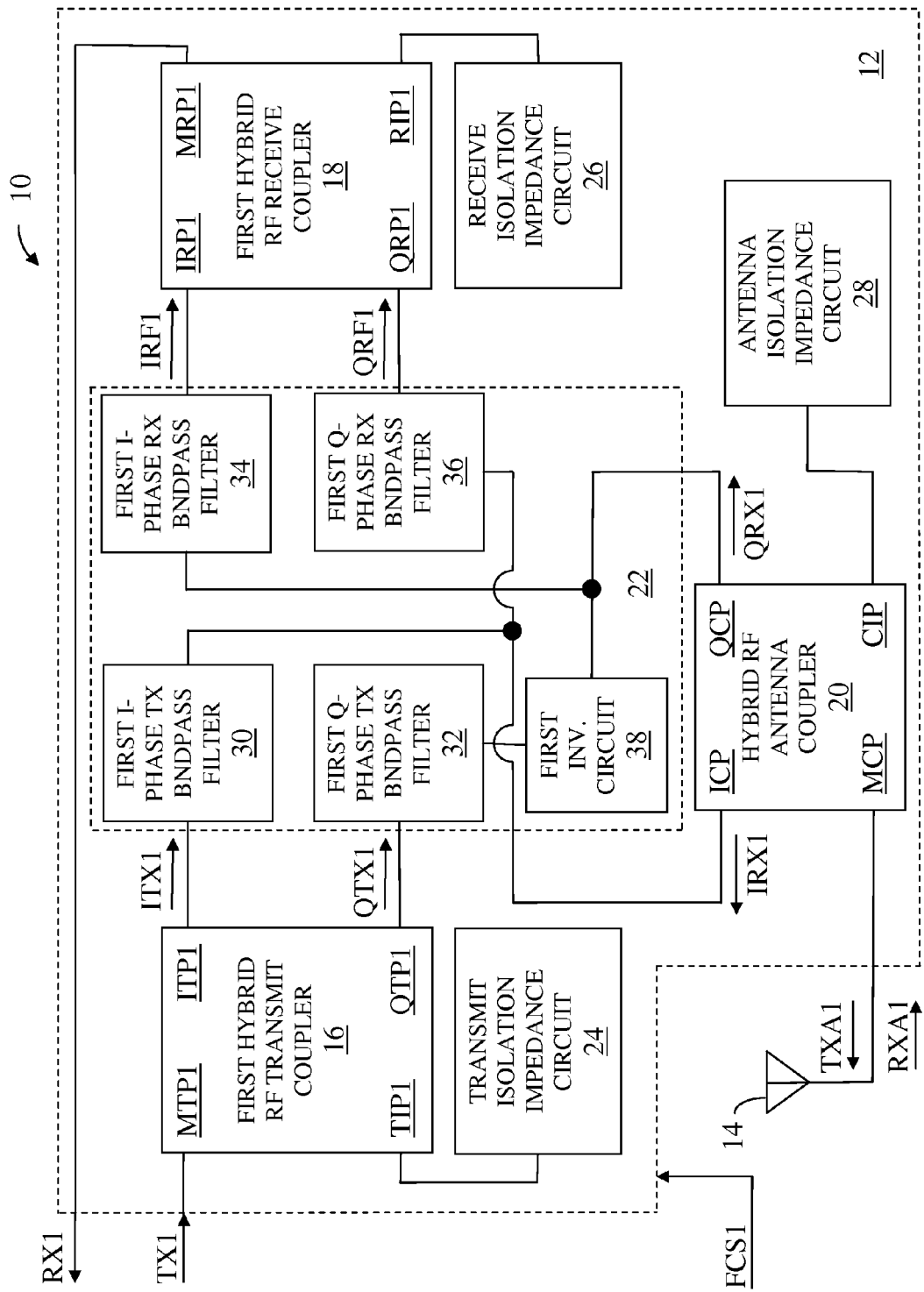
FIG. 5 shows the RF circuitry according to a further embodiment of the RF circuitry.

FIG. 5 shows the RF circuitry 10 according to a further embodiment of the RF circuitry 10. The RF circuitry 10 illustrated in FIG. 5 is similar to the RF circuitry 10 illustrated in FIG. 2, except in the RF circuitry 10 illustrated in FIG. 5, the first inversion circuit 38 is located differently. As such, FIG. 5 shows details of the RF bandpass filter and inversion circuitry 22. The RF bandpass filter and inversion circuitry 22 includes the first in-phase transmit bandpass filter 30, the first quadrature-phase transmit bandpass filter 32, the first in-phase receive bandpass filter 34, the first quadrature-phase receive bandpass filter 36, and the first inversion circuit 38.

The first in-phase transmit bandpass filter 30 is coupled between the in-phase coupler port ICP and the first in-phase transmit port ITP1. The first quadrature-phase transmit bandpass filter 32 and the first inversion circuit 38 are coupled in series between the quadrature-phase coupler port QCP and the first quadrature-phase transmit port QTP1. In this regard, the signal inversion is associated with the quadrature-phase coupler port QCP. The first in-phase receive bandpass filter 34 is coupled between the quadrature-phase coupler port QCP and the first in-phase receive port IRP1. The first quadrature-phase receive bandpass filter 36 is coupled between the in-phase coupler port ICP and the first quadrature-phase receive port QRP1.

In general, the RF bandpass filter and inversion circuitry 22 provides the signal inversion, which is associated with only one of the in-phase coupler port ICP and the quadrature-phase coupler port QCP. As mentioned above, the signal inversion is associated with the quadrature-phase coupler port QCP.

In general, the RF bandpass filter and inversion circuitry 22 provides bandpass filtering between the hybrid RF antenna coupler 20 and the first hybrid RF receive coupler 18, and further provides bandpass filtering between the hybrid RF antenna coupler 20 and the first hybrid RF transmit coupler 16.

Figure 6:
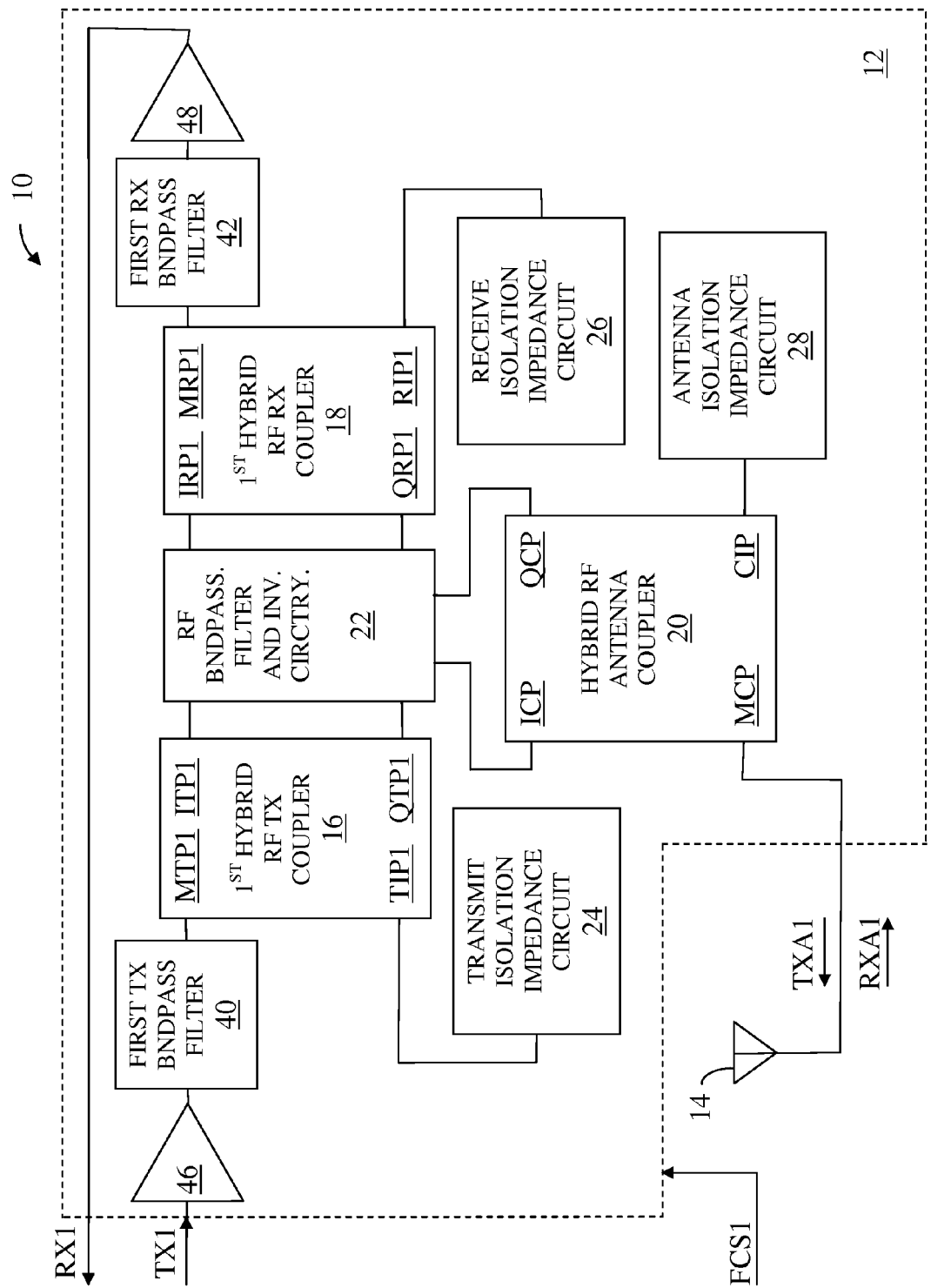
FIG. 6 shows the RF circuitry according to one embodiment of the RF circuitry.

FIG. 6 shows the RF circuitry 10 according to one embodiment of the RF circuitry 10. The RF circuitry 10 illustrated in FIG. 6 is similar to the RF circuitry 10 illustrated in FIG. 3, except in the RF circuitry 10 illustrated in FIG. 6, the transmit and receive RF multiplexer 12 further includes an RF power amplifier (PA) 46 and an RF low noise amplifier (LNA) 48. The first transmit bandpass filter 40 is coupled between an output from the RF PA 46 and the first main transmit port MTP1. The first receive bandpass filter 42 is coupled between an input to the RF LNA 48 and the first main receive port MRP1.

The RF PA 46 receives and amplifies the first transmit signal TX1 to provide an amplified signal to the first hybrid RF transmit coupler 16 via the first transmit bandpass filter 40. The first hybrid RF receive coupler 18 provides an RF receive signal to the RF LNA 48 via the first receive bandpass filter 42. The RF LNA 48 amplifies the RF receive signal to provide the first receive signal RX1.

In one embodiment of the transmit and receive RF multiplexer 12, the transmit and receive RF multiplexer 12 includes the first hybrid RF transmit coupler 16, the first hybrid RF receive coupler 18, the hybrid RF antenna coupler 20, the RF bandpass filter and inversion circuitry 22, the first transmit bandpass filter 40, the first receive bandpass filter 42, the RF PA 46, and the RF LNA 48. As such, in one embodiment of the transmit and receive RF multiplexer 12, a single RF module includes the transmit and receive RF multiplexer 12.

Figure 7:
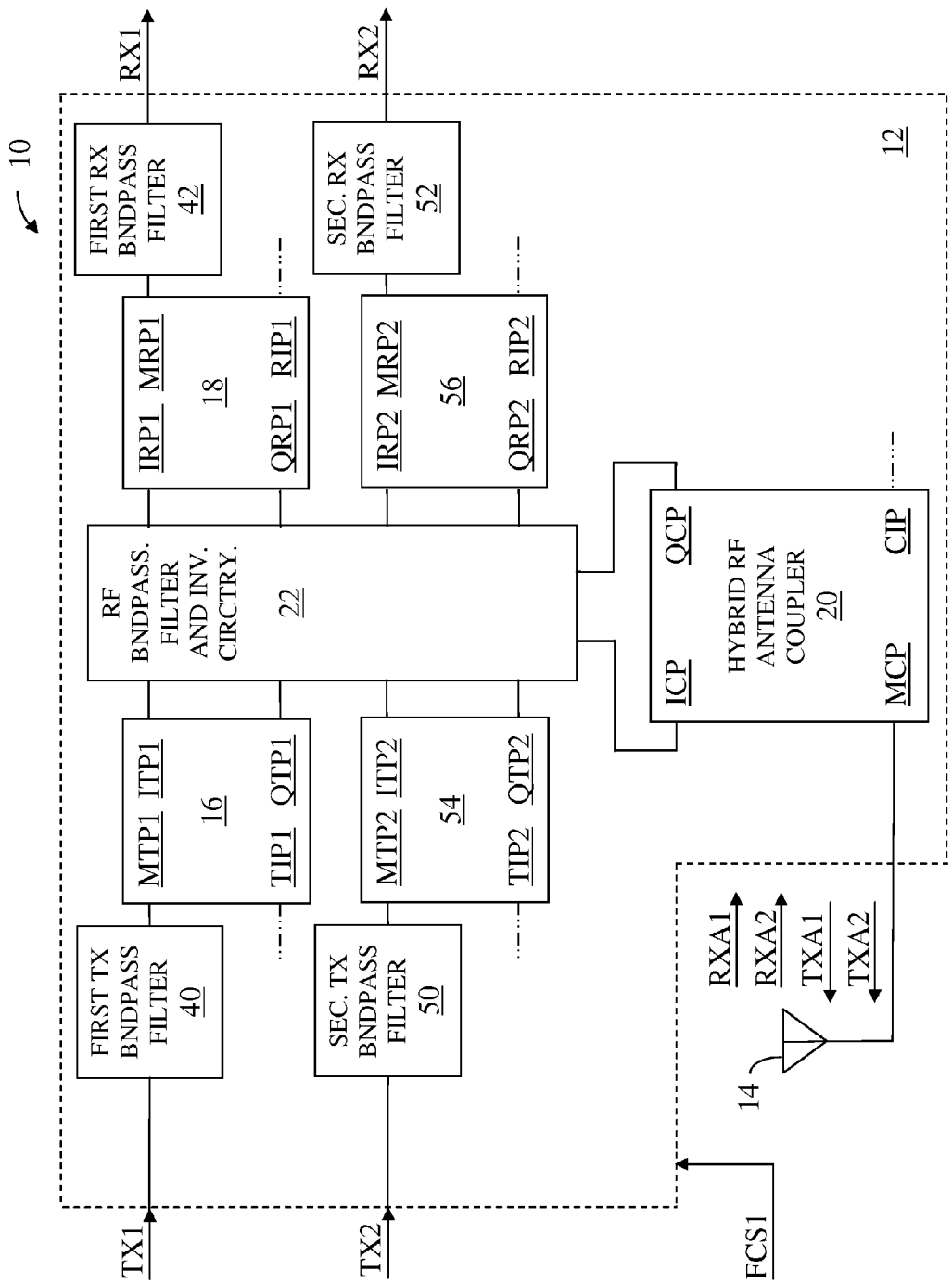
FIG. 7 shows the RF circuitry according to another embodiment of the RF circuitry.

FIG. 7 shows the RF circuitry 10 according to another embodiment of the RF circuitry 10. The RF circuitry 10 illustrated in FIG. 7 is similar to the RF circuitry 10 illustrated in FIG. 3, except in the RF circuitry 10 illustrated in FIG. 7, the transmit and receive RF multiplexer 12 further includes a second transmit bandpass filter 50, a second receive bandpass filter 52, a second hybrid RF transmit coupler 54, and a second hybrid RF receive coupler 56. The second hybrid RF transmit coupler 54 includes a second in-phase transmit port ITP2, a second quadrature-phase transmit port QTP2, a second main transmit port MTP2, and a second transmit isolation port TIP2. The second hybrid RF receive coupler 56 includes a second in-phase receive port IRP2, a second quadrature-phase receive port QRP2, a second main receive port MRP2, and a second receive isolation port RIP2. The transmit isolation impedance circuit 24, the receive isolation impedance circuit 26, and the antenna isolation impedance circuit 28 are not shown to simplify FIG. 7.

The second transmit bandpass filter 50 is coupled to the second main transmit port MTP2. The second in-phase transmit port ITP2 and the second quadrature-phase transmit port QTP2 are coupled to the RF bandpass filter and inversion circuitry 22. The second receive bandpass filter 52 is coupled to the second main receive port MRP2. The second in-phase receive port IRP2 and the second quadrature-phase receive port QRP2 are coupled to the RF bandpass filter and inversion circuitry 22.

In one embodiment of the RF circuitry 10, the second transmit bandpass filter 50 functions similarly to the first transmit bandpass filter 40. The second hybrid RF transmit coupler 54 functions similarly to the first hybrid RF transmit coupler 16. The second receive bandpass filter 52 functions similarly to the first receive bandpass filter 42. The second hybrid RF receive coupler 56 functions similarly to the first hybrid RF receive coupler 18.

In this regard, the transmit and receive RF multiplexer 12 receives and processes a second transmit signal TX2 via the second transmit bandpass filter 50, the second hybrid RF transmit coupler 54, the RF bandpass filter and inversion circuitry 22, and the hybrid RF antenna coupler 20 to provide a second antenna transmit signal TXA2 to the primary RF antenna 14. Additionally, a second antenna receive signal RXA2 is received and forwarded by the primary RF antenna 14 through the hybrid RF antenna coupler 20, the RF bandpass filter and inversion circuitry 22, the second hybrid RF receive coupler 56, and the second receive bandpass filter 52 to provide a second receive signal RX2.

As such, in one embodiment of the RF circuitry 10, the first hybrid RF receive coupler 18 and the second hybrid RF receive coupler 56 provide receive carrier aggregation. In one embodiment of the RF circuitry 10, the first hybrid RF transmit coupler 16 and the second hybrid RF transmit coupler 54 provide transmit carrier aggregation.

Figure 8:
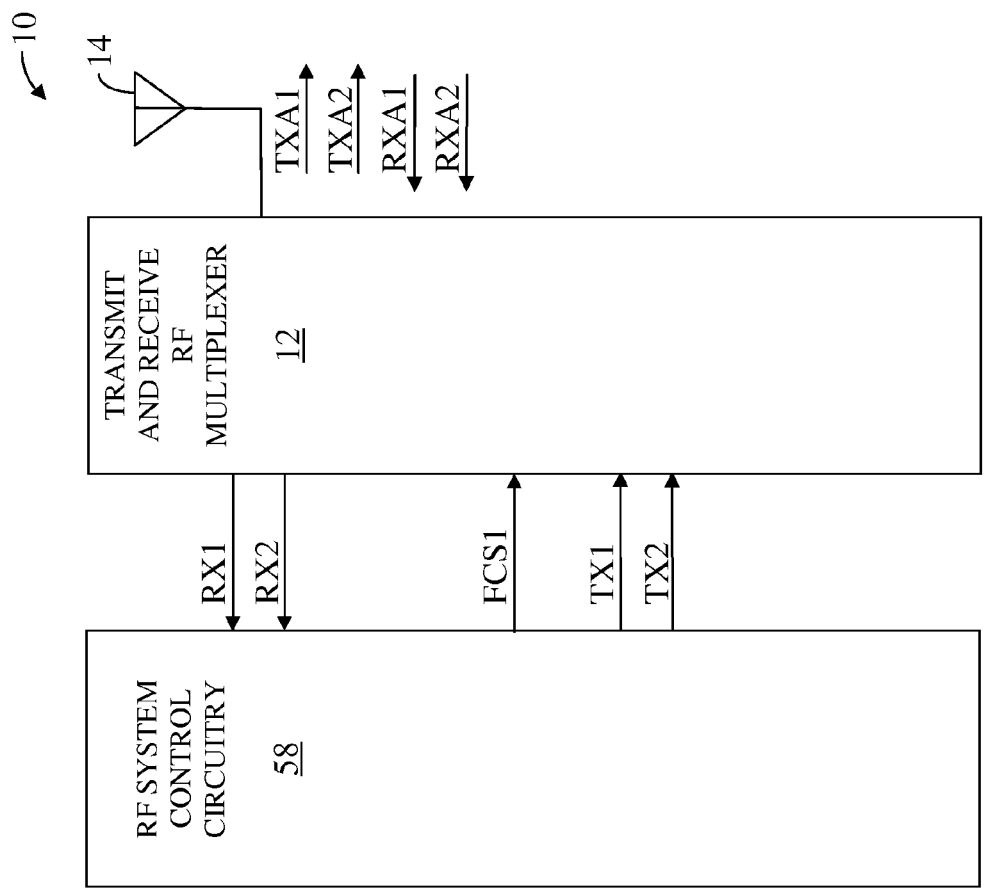
FIG. 8 shows the RF circuitry according to an alternate embodiment of the RF circuitry.

FIG. 8 shows the RF circuitry 10 according to an alternate embodiment of the RF circuitry 10. The RF circuitry 10 illustrated in FIG. 8 includes the transmit and receive RF multiplexer 12 illustrated in FIG. 7, the primary RF antenna 14 illustrated in FIG. 7, and RF system control circuitry 58. The RF system control circuitry 58 receives the first receive signal RX1 and the second receive signal RX2 from the transmit and receive RF multiplexer 12. The RF system control circuitry 58 provides the first transmit signal TX1, the second transmit signal TX2, and the first function configuration signal FCS1 to the transmit and receive RF multiplexer 12.

Those skilled in the art will recognize improvements and modifications to the embodiments of the present disclosure. All such improvements and modifications are considered within the scope of the concepts disclosed herein and the claims that follow.

What is claimed is:

1. A transmit and receive RF multiplexer comprising:
   a first hybrid RF transmit coupler having a first main transmit port and a pair of transmit ports having a first in-phase transmit port and a first quadrature-phase transmit port;
   a first hybrid RF receive coupler having a first main receive port and a pair of receive ports having a first in-phase receive port and a first quadrature-phase receive port;
   a hybrid RF antenna coupler having a main coupler port and a pair of coupler ports having an in-phase coupler port and a quadrature-phase coupler port, such that the main coupler port is coupled to a primary RF antenna; and
   RF bandpass filter and inversion circuitry configured to:
      provide bandpass filtering between the pair of coupler ports and the pair of transmit ports;
      provide bandpass filtering between the pair of coupler ports and the pair of receive ports; and
      provide a signal inversion associated with only one of the in-phase coupler port and the quadrature-phase coupler port.

2. The transmit and receive RF multiplexer of claim 1 wherein the hybrid RF antenna coupler is configured to simultaneously transmit and receive a first antenna transmit signal and a first antenna receive signal, respectively, via the main coupler port.

3. The transmit and receive RF multiplexer of claim 1 further comprising a transmit isolation impedance circuit wherein:
   the first hybrid RF transmit coupler further has a first transmit isolation port;
   the transmit isolation impedance circuit is coupled to the first transmit isolation port; and
   the transmit isolation impedance circuit is configured to present a transmit isolation impedance to the first transmit isolation port.

4. The transmit and receive RF multiplexer of claim 3 wherein the transmit isolation impedance circuit is further configured to provide about a 90 degree phase-shift at the first transmit isolation port.

5. The transmit and receive RF multiplexer of claim 1 further comprising a transmit isolation impedance circuit wherein:
   the first hybrid RF transmit coupler further has a first transmit isolation port;
   the transmit isolation impedance circuit is coupled to the first transmit isolation port;
   the transmit isolation impedance circuit is configured to present a transmit isolation impedance to the first transmit isolation port;

the first hybrid RF transmit coupler is configured to receive a first transmit signal, which has a transmit frequency, via the first main transmit port; and the transmit isolation impedance circuit is further configured to adjust the transmit isolation impedance to increase isolation between the first main transmit port and the first main receive port at the transmit frequency.

6. The transmit and receive RF multiplexer of claim 1 further comprising a receive isolation impedance circuit wherein:

the first hybrid RF receive coupler further has a first receive isolation port;

the receive isolation impedance circuit is coupled to the first receive isolation port; and the receive isolation impedance circuit is configured to present a receive isolation impedance to the first receive isolation port.

7. The transmit and receive RF multiplexer of claim 1 further comprising a receive isolation impedance circuit wherein:

the first hybrid RF receive coupler further has a first receive isolation port;

the receive isolation impedance circuit is coupled to the first receive isolation port;

the receive isolation impedance circuit is configured to present a receive isolation impedance to the first receive isolation port;

the first hybrid RF receive coupler is configured to provide a first receive signal, which has a receive frequency, via the first main receive port; and the receive isolation impedance circuit is further configured to adjust the receive isolation impedance to increase isolation between the first main transmit port and the first main receive port at the receive frequency.

8. The transmit and receive RF multiplexer of claim 1 further comprising an antenna isolation impedance circuit wherein:

the hybrid RF antenna coupler further has a coupler isolation port;

the antenna isolation impedance circuit is coupled to the coupler isolation port; and the antenna isolation impedance circuit is configured to present an antenna isolation impedance to the coupler isolation port.

9. The transmit and receive RF multiplexer of claim 1 further comprising an antenna isolation impedance circuit wherein:

the hybrid RF antenna coupler further has a coupler isolation port;

the antenna isolation impedance circuit is coupled to the coupler isolation port;

the antenna isolation impedance circuit is configured to present an antenna isolation impedance to the coupler isolation port; and the antenna isolation impedance circuit is further configured to adjust the antenna isolation impedance to increase isolation between the first main transmit port and the first main receive port.

10. The transmit and receive RF multiplexer of claim 1 wherein:

the first hybrid RF transmit coupler is configured to receive a first transmit signal via the first main transmit port, and then split and phase-shift the first transmit signal to provide a first in-phase transmit signal and a first quadrature-phase transmit signal;

the RF bandpass filter and inversion circuitry is configured to receive, filter, and forward the first in-phase transmit signal and the first quadrature-phase transmit signal to the hybrid RF antenna coupler via the in-phase coupler port and the quadrature-phase coupler port, respectively; and the hybrid RF antenna coupler is configured to receive, phase-shift, and combine the forwarded first in-phase transmit signal and the forwarded first quadrature-phase transmit signal to provide a first antenna transmit signal to the primary RF antenna via the main coupler port.

11. The transmit and receive RF multiplexer of claim 10 wherein the RF bandpass filter and inversion circuitry is further configured to:

substantially pass transmit frequencies of the first in-phase transmit signal and the first quadrature-phase transmit signal, thereby allowing the first in-phase transmit signal and the first quadrature-phase transmit signal to be substantially forwarded to the hybrid RF antenna coupler; and substantially stop transmit frequencies of the first in-phase transmit signal and the first quadrature-phase transmit signal, thereby substantially blocking the first in-phase transmit signal and the first quadrature-phase transmit signal from the first quadrature-phase receive port and the first in-phase receive port.

12. The transmit and receive RF multiplexer of claim 10 wherein the RF bandpass filter and inversion circuitry is further configured to apply an additional phase-shift between the first in-phase transmit signal and the first quadrature-phase transmit signal of about 180 degrees, such that any remainders of the first in-phase transmit signal and the first quadrature-phase transmit signal that reach the first quadrature-phase receive port and the first in-phase receive port are received, phase-shifted, and substantially cancelled by the first hybrid RF receive coupler.

13. The transmit and receive RF multiplexer of claim 1 wherein:

the hybrid RF antenna coupler is configured to receive a first antenna receive signal via the main coupler port, and then split and phase-shift the first antenna receive signal to provide a first in-phase receive signal and a first quadrature-phase receive signal;

the RF bandpass filter and inversion circuitry is configured to receive, filter, and forward the first in-phase receive signal and the first quadrature-phase receive signal provide a first filtered in-phase receive signal and a first filtered quadrature-phase receive signal to the first hybrid RF receive coupler via the first in-phase receive port and the first quadrature-phase receive port, respectively; and the first hybrid RF receive coupler is configured to receive, phase-shift, and combine the first filtered in-phase receive signal and the first filtered quadrature-phase receive signal to provide a first receive signal via the first main receive port.

14. The transmit and receive RF multiplexer of claim 13 wherein the RF bandpass filter and inversion circuitry is further configured to:

substantially pass receive frequencies of the first in-phase receive signal and the first quadrature-phase receive signal, thereby allowing the first in-phase receive signal and the first quadrature-phase receive signal to be forwarded to the first hybrid RF receive coupler; and substantially stop receive frequencies of the first in-phase receive signal and the first quadrature-phase receive signal, thereby substantially blocking the first in-phase receive signal and the first quadrature-phase receive signal from the first quadrature-phase transmit port and the first in-phase transmit port.

15. The transmit and receive RF multiplexer of claim 13 wherein the RF bandpass filter and inversion circuitry is further configured to apply an additional phase-shift between the first filtered in-phase receive signal and the first filtered quadrature-phase receive signal, such that any remainders of the first filtered in-phase receive signal and the first filtered quadrature-phase receive signal that reach the first quadrature-phase transmit port and the first in-phase transmit port are received, phase-shifted, and substantially cancelled by the first hybrid RF transmit coupler.

16. The transmit and receive RF multiplexer of claim 1 wherein:
the first hybrid RF transmit coupler is configured to receive a first transmit signal via the first main transmit port; and
the first hybrid RF transmit coupler is further configured to provide harmonic filtering to at least partially remove harmonics of the first transmit signal.

17. The transmit and receive RF multiplexer of claim 1 wherein:
the first hybrid RF transmit coupler is configured to receive a first transmit signal via the first main transmit port; and
the hybrid RF antenna coupler is configured to provide harmonic filtering to at least partially remove harmonics of the first transmit signal.

18. The transmit and receive RF multiplexer of claim 1 further comprising:
a first in-phase transmit bandpass filter coupled between the quadrature-phase coupler port and the first in-phase transmit port;
a first quadrature-phase transmit bandpass filter coupled between the in-phase coupler port and the first quadrature-phase transmit port;
a first inversion circuit;
a first in-phase receive bandpass filter coupled in series with the first inversion circuit between the in-phase coupler port and the first in-phase receive port; and
a first quadrature-phase receive bandpass filter coupled between the quadrature-phase coupler port and the first quadrature-phase receive port.

19. The transmit and receive RF multiplexer of claim 18 wherein:
the first in-phase transmit bandpass filter comprises a first order resonator that is configured to substantially pass a transmit frequency of a first in-phase transmit signal and substantially stop receive frequencies of a first quadrature-phase receive signal;
the first quadrature-phase transmit bandpass filter comprises a first order resonator that is configured to substantially pass a transmit frequency of a first quadrature-phase transmit signal and substantially stop receive frequencies of a first in-phase receive signal;
the first in-phase receive bandpass filter comprises a first order resonator that is configured to substantially pass a receive frequency of a first in-phase receive signal and substantially stop transmit frequencies of a first quadrature-phase transmit signal; and
the first quadrature-phase receive bandpass filter comprises a first order resonator that is configured to substantially pass a receive frequency of a first quadrature-phase receive signal and substantially stop transmit frequencies of a first in-phase transmit signal.

20. The transmit and receive RF multiplexer of claim 19 further wherein:

the first in-phase transmit bandpass filter is configured to use a first function configuration signal, which is based on the transmit frequency of the first in-phase transmit signal, to tune the first order resonator of the first in-phase transmit bandpass filter;
the first quadrature-phase transmit bandpass filter is configured to use the first function configuration signal, which is based on the transmit frequency of the first quadrature-phase transmit signal, to tune the first order resonator of the first quadrature-phase transmit bandpass filter;
the first in-phase receive bandpass filter is configured to use the first function configuration signal, which is based on the receive frequency of the first in-phase receive signal, to tune the first order resonator of the first in-phase receive bandpass filter; and
the first quadrature-phase receive bandpass filter is configured to use the first function configuration signal, which is based on the receive frequency of the first quadrature-phase receive signal, to tune the first order resonator of the first quadrature-phase receive bandpass filter.

21. The transmit and receive RF multiplexer of claim 1 further comprising:
a first in-phase transmit bandpass filter coupled between the quadrature-phase coupler port and the first in-phase transmit port;
a first quadrature-phase transmit bandpass filter coupled between the in-phase coupler port and the first quadrature-phase transmit port;
a first in-phase receive bandpass filter coupled between the in-phase coupler port and the first in-phase receive port, such that one of an upstream signal path to the first in-phase receive bandpass filter and a downstream signal path from the first in-phase receive bandpass filter is a differential signal path configured to provide a signal inversion; and
a first quadrature-phase receive bandpass filter coupled between the quadrature-phase coupler port and the first quadrature-phase receive port.

22. The transmit and receive RF multiplexer of claim 1 further comprising a first transmit bandpass filter and a first receive bandpass filter wherein:
the first transmit bandpass filter is coupled to the first main transmit port;
the first transmit bandpass filter is configured to receive and filter a first transmit signal to provide a filtered transmit signal to the first hybrid RF transmit coupler via the first main transmit port;
the first receive bandpass filter is coupled to the first main receive port; and
the first receive bandpass filter is configured to receive and filter a signal from the first hybrid RF receive coupler via the first main receive port to provide a first receive signal.

23. The transmit and receive RF multiplexer of claim 22 wherein:
the first transmit bandpass filter is one of a second order bandpass filter and a higher than second order bandpass filter; and
the first receive bandpass filter is one of a second order bandpass filter and a higher than second order bandpass filter.

24. The transmit and receive RF multiplexer of claim 22 wherein:
the first transmit bandpass filter is a tunable bandpass filter that is configured to use a first function configuration signal, which is based on a transmit frequency of the first transmit signal, to tune the first transmit bandpass filter; and the first receive bandpass filter is a tunable bandpass filter that is configured to use the first function configuration signal, which is further based on the a receive frequency of the first receive signal, to tune the first receive bandpass filter.

25. The transmit and receive RF multiplexer of claim 1 further comprising a first transmit bandpass filter, a first receive bandpass filter, and a second receive bandpass filter wherein:

the first transmit bandpass filter is coupled to the first main transmit port;

the first transmit bandpass filter is configured to receive and filter a first transmit signal to provide a filtered transmit signal to the first hybrid RF transmit coupler via the first main transmit port;

the first receive bandpass filter is coupled to the first main receive port;

the second receive bandpass filter is coupled to the first main receive port;

the first receive bandpass filter is configured to receive and filter a signal from the first hybrid RF receive coupler via the first main receive port to provide a first receive signal; and the second receive bandpass filter is configured to receive and filter the signal from the first hybrid RF receive coupler via the first main receive port to provide a second receive signal.

26. The transmit and receive RF multiplexer of claim 1 further comprising:

a first in-phase transmit bandpass filter coupled between the in-phase coupler port and the first in-phase transmit port;

a first inversion circuit;

a first quadrature-phase transmit bandpass filter coupled in series with the first inversion circuit between the quadrature-phase coupler port and the first quadrature-phase transmit port;

a first in-phase receive bandpass filter coupled between the quadrature-phase coupler port and the first in-phase receive port; and a first quadrature-phase receive bandpass filter coupled between the in-phase coupler port and the first quadrature-phase receive port.

27. The transmit and receive RF multiplexer of claim 1 wherein the transmit and receive RF multiplexer further comprises a first transmit bandpass filter, a first receive bandpass filter, an RF power amplifier (PA), and an RF low noise amplifier (LNA).

28. The transmit and receive RF multiplexer of claim 27 wherein a single RF module comprises the transmit and receive RF multiplexer.

29. The transmit and receive RF multiplexer of claim 1 further comprising a second hybrid RF receive coupler, such that the first hybrid RF receive coupler and the second hybrid RF receive coupler are configured to provide receive carrier aggregation.

30. The transmit and receive RF multiplexer of claim 1 further comprising a second hybrid RF transmit coupler, such that the first hybrid RF transmit coupler and the second hybrid RF transmit coupler provide transmit carrier aggregation.

* * * * *